United States Patent
Fraenkel et al.

(10) Patent No.: US 6,654,949 B1
(45) Date of Patent: Nov. 25, 2003

(54) METHOD AND SYSTEM FOR MONITORING THE EXECUTION OF HYBRID SOURCE CODE

(75) Inventors: Michael L. Fraenkel, Raleigh, NC (US); Christopher H. Gerken, Apex, NC (US); Arthur G. Ryman, Thornhill (CA); Patsy S. H. Yu, Toronto (CA); Siu C. Yuen, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/450,596

(22) Filed: Nov. 30, 1999

(30) Foreign Application Priority Data

Nov. 30, 1998 (CA) ............................................. 2255023

(51) Int. Cl.[7] ................................................. G06F 9/44
(52) U.S. Cl. .......................... 717/130; 717/124; 717/127
(58) Field of Search ................................. 717/127–131, 717/136–141, 146, 114–118, 154–158; 709/223–226; 714/35, 39, 45, 37, 38; 345/700–866

(56) References Cited

U.S. PATENT DOCUMENTS

| | | | | |
|---|---|---|---|---|
| 5,410,648 A | * | 4/1995 | Pazel ........................ | 717/132 |
| 5,973,696 A | * | 10/1999 | Agranat et al. ............. | 345/760 |
| 6,063,133 A | * | 5/2000 | Li et al. .................... | 717/136 |
| 6,161,200 A | * | 12/2000 | Rees et al. ................. | 717/130 |
| 6,173,440 B1 | * | 1/2001 | Darty ........................ | 717/130 |
| 6,209,007 B1 | * | 3/2001 | Kelley et al. ............... | 707/102 |
| 6,247,020 B1 | * | 6/2001 | Minard ...................... | 717/100 |

OTHER PUBLICATIONS

Hamilton, Java and the Shift to Net–Centric Computing. IEEE. 1996. pp. 31–39.*
JavaServer Pages Specification–Draft. http://hunter.cinet.cn.ua:8101/docs/java/gnujsp091/jsp_spec.html. Jun. 1998.*
Bechini et al. Design of a Toolset for Dynamic Analysis of Concurrent Java Programs. IEEE. 1998. pp. 190–197.*
Ball et al. Optimally Profiling and Tracing Programs. ACM. 1994. pp. 1319–1360.*

* cited by examiner

Primary Examiner—Wei Zhen
(74) Attorney, Agent, or Firm—Scully, Scott, Murphy & Presser; Manny W. Schecter, Esq.

(57) ABSTRACT

This invention describes a system and method for monitoring the execution of hybrid source code such as JavaServer Pages (JSP) code. The system comprises a page compiler, which is called by a server for translating JSP code into a servlet for execution by the server. The page compiler during translation of the JSP code inserts instrumentation in the compiled JSP code for supporting execution tracing by an execution monitor. The execution monitor receives outputs from the page compiler, the servlet and the raw JSP code for displaying selected information about the execution of the JSP code to the developer on a graphical user interface. The execution monitor thus allows the developer to view the correlation between the JSP code, the servlet code and the HTML code that is generated by the servlet.

24 Claims, 6 Drawing Sheets

METHOD AND SYSTEM FOR MONITORING THE EXECUTION OF HYBRID SOURCE CODE

BACKGROUND OF THE INVENTION

1. Technical Field

The present invention relates to a method and system for monitoring the execution of hybrid source code, and more particularly to an execution monitor for code containing Java and HTML source code.

2. Prior Art

The ubiquitous Internet, is essentially a network of computers connected using the TCP/IP as the transportation mechanism for communicating between the computers. The World Wide Web (WWW) allows users on one computer to access files and data on remote computers using a program called a Web browser. One feature of a browser is that it allows a user to read, in a graphical user interfave (GUI), Hyper Text Markup Language (HTML) documents or, colloquially, Web pages. Essentially, when the person accessing the Internet (the user) opens a browser or another similar program to view Web pages a URL (uniform resource locator) must be specified by the user, by the browser or by another software program. The URL specifies the address of the computer (server) from which the Web page is being requested. The server then, directly or indirectly, delivers the requested Web pages in the form of an HTML file to the browser over the Internet, generally using the Hypertext Transfer Protocol (HTTP). The browser then translates the file for viewing by the user.

As the use of the Internet progressed it became clear that simply providing people with static pages that contained only text and images was not going to be enough. For example, businesses that were going "on-line" needed more powerful tools that could allow the user to access their databases and to purchase goods over the Internet.

Unfortunately, not everyone uses the same computers or even the same operating systems, so a need arose for a programming language that could operate on any machine regardless of its operating system. One of the languages that has accomplished this is Sun Microsystems, Inc.'s Java™ language, an object-oriented, network capable programming language. Java code is run on a virtual machine within an operating system. The communication between the virtual machine and the Java program is the same for all operating systems, and the virtual machine communicates to the operating system it is running on. Java programs can run as stand alone applications or as applets running under a Java capable browser. To create an applet, the developer writes it in the Java language, compiles it and calls it from a HTML Web page. To create an application, the developer writes it in the Java language, compiles it and calls it from the command line or from another program.

Currently, the most visible examples of Java software are "applets" that are available on the Internet. These applets are sent from the server to the browser, which acts as the virtual machine to execute the applet However, there are other kinds of Java software, including software that runs on servers, or on large mainframe computers. In these cases, Java may be used to monitor transactions, manipulate data, or to streamline the flow of information between departments, suppliers, and customers.

Further developments in this area have led to JavaServer™Pages™(JSP) technology, which is a new hybrid language. JSP technology allows Java code to be imbedded directly into a static HTML Web document. This feature makes it possible to create dynamically generated content for Web pages quickly and easily on the server. Also, the imbedded Java code is designed to act more as a scripting language than Java programming, although it may act as both, emphasizing the use of components conforming to Sun Microsystems, Inc.'s JavaBeans™ specification.

JavaBeans is a portable, platform-independent component model written in the Java programming language. JavaBeans acts as a bridge between proprietary component models. Since these components do much of the processing work, component development is more cleanly separated from Web design (formatting). Therefore, teams developing the component (business rules) aspect of the Web page do not have to be a concerned with the appearance of the page, and vice versa.

Another advantage of the JSP technology is that it is compiled and executed on the server side. An important result of this is the fact that the browser doesn't need to have any special capabilities to view a JSP file or page since it is completely processed on the server side and delivered to the browser in HTML format. Another result is that the JSP file is only compiled once. The server checks to see if the JSP file has been altered since it was last compiled. If it has then it is recompiled, but if it hasn't then it can be run from memory reducing the average access time of the page.

From a developer's point of view, there are however still some deficiencies with the JSP development environment. Currently, the only method a developer has of verifying the JSP code that has been written is to load the page onto a Web server, load it through a Web browser and inspect the output. This method, however, is far from satisfactory, as the developer has to guess where an error in the JSP page is originating. Further, it is a very tedious process that can lead to unwanted errors.

SUMMARY OF THE INVENTION

In accordance with an aspect of the invention, there is provided a method for monitoring the execution of hybrid source code which is executable on a server, comprising the steps of: generating executable code for execution by the server from the hybrid source code; providing instrumentation in the executable code for supporting execution tracing; and receiving in an execution monitor information from the instrumentation in the executable code for display on a user interface.

The step of generating executable code may further comprise translating the hybrid source code into source code. The step of providing instrumentation may also comprise inserting instrumentation into the source code.

The instrumentation may comprise a mapping table comprising information correlating a code segment in the hybrid source code with a line in the source code. The instrumentation may further comprise a line method for communicating said correlating information to the execution monitor. The method may also comprise displaying on the user interface the hybrid source code and the source code. The method may further comprise correlating a code segment from the hybrid source code with one or more lines of code from the source code using the instrumentation. The hybrid source code may be JavaServer Pages code.

There is also provided a method for monitoring execution of hybrid source code which executes in a server, comprising the steps of translating the hybrid source code by a page compiler into a source code form and an executable code;

providing methods into the executable code, such that when the server executes the executable code, the methods are invoked and send line information to an execution monitor allowing the execution monitor to synchronize an executing code segment of the hybrid source code with a corresponding line of the source code; and displaying the executing code segment of the hybrid source and the corresponding line of the source code in a user interface.

In accordance with another aspect of the invention, there is provided a program storage device readable by a data processing system, tangibly embodying a program of instructions, executable by the data processing system to perform the above method steps.

In accordance with another aspect of the invention, a computer program product for monitoring the execution of hybrid source code which is executable on a server, said computer program product comprising a page compiler for reading and translating the hybrid source code into executable code for execution by the server and for inserting instrumentation in the executable code for supporting execution tracing; and an execution monitor for receiving information from the instrumentation in the executable code for display on a user interface.

There is also provided a computer program product for displaying the execution of hybrid source code, comprising a page compiler for translating the hybrid source code into source code, inserting instrumentation for execution tracing in the source code and compiling the hybrid source code into executable code; an execution monitor for receiving as input and for displaying in a user interface of the execution monitor, the hybrid source, the source code, and information from the instrumentation in the executable code. The computer program product may filer comprise a server for executing the executable code provided by the page compiler, and providing the information from the instrumentation in the executable code to the execution monitor. The computer program product may further comprise a browser for sending a request with respect to the hybrid source code, wherein the server further invokes the page compiler in response to the request and provides the output from the executable code to the browser. The execution monitor may further receive output from the executable code and wherein the server provides the output from the executable code to the execution monitor. The computer program product may further comprise a bi-directional communications means for communicating between the executing code and the execution monitor including communicating the information from the instrumentation in the executable code to the execution monitor. And the hybrid source code may be JavaServer Pages code.

In accordance with another aspect of the invention, there is provided a computer system monitoring the execution of hybrid source code which is executable on a server, said computer system comprising a page compiler for reading and translating the hybrid code into executable code for execution by the server and for inserting instrumentation in the executable code for supporting execution tracing; and an execution monitor for receiving information from the instrumentation in the executable code for display on a user interface.

In accordance with another aspect of the invention, there is provided a computer system for displaying the execution of hybrid source code, comprising a page compiler for translating the hybrid source code into source code, inserting instrumentation for execution tracing in the source code and compiling the hybrid source code into executable code; and an execution monitor for receiving as input and for displaying in a user interface of the execution monitor, the hybrid source, the source code, and information from the instrumentation in the executable code. The computer may further comprise a server for executing the executable code provided by the page compiler, and providing the information from the instrumentation in the executable code to the execution monitor. The computer system may further comprise a browser for sending a request with respect to the hybrid source code, wherein the server further invokes the page compiler in response to the request and provides the output from the executable code to the browser. Further, the execution monitor may further receive output from the executable code and wherein the server provides the output from the executable code to the execution monitor. The computer system may further comprise a bi-directional communication means for communicating information between the executing code and the execution monitor including information from the instrumentation to correlate a code segment of the hybrid source code and a line in the source code.

In accordance with another aspect of the invention, there is provided an article of manufacture comprising a computer usable medium having a computer readable program code embodied therein for monitoring the execution of hybrid source code, comprising HTML and Java code, running on a Web application server, the computer readable program code in said article of manufacture comprising computer readable program code configured to cause a computer to read and translate the hybrid source code into an executable program and for inserting instrumentation in the executable program; computer readable program code configured to cause a computer to read the hybrid source code, a source code of the executable program and an output from the executable program and for displaying the hybrid source code, source code and the output in respective views on a graphical user interface; and computer readable program code configured to cause a computer to communicate information between the instrumentation of the executing program and the graphical user interface whereby the information is used by the graphical user interface to correlate in the views a code segment of the hybrid source code with a line in the source code of the executable code.

BRIEF DESCRIPTION OF THE DRAWINGS

Preferred embodiments of the present invention will now be described, by way of example only, with reference to the accompanying drawings in which.

DETAILED DESCRIPTION OF THE
PREFERRED EMBODIMENTS OF THE
INVENTION

Figure 1:
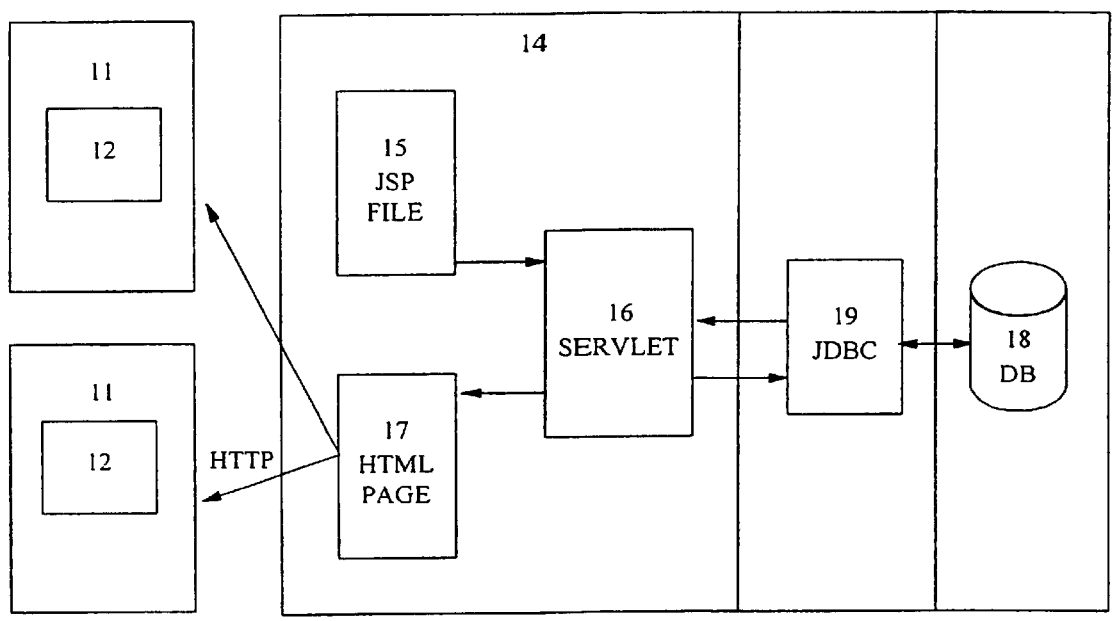
FIG. 1 is a block diagram of a Web based application.

Referring to FIG. 1, a schematic diagram of a simple two tier model of a Web-based application utilizing the JavaServer Pages technology is shown schematically by numeral 10. This model includes a first tier comprising clients 11 and a second tier comprising a server 14. These first tier clients comprise a number of Java enabled browsers 12 on various devices such as personal computers, workstations and network computers. The server side of such a system comprises servlets running inside a Java Web server. In this example, the client makes a request for a JSP page that is handled by the server (not shown). The server generates the dynamic content of the JSP page by loading a JSP file 15, which contains both business rules and logic of an application as well as standard document formatting such as HTML, the syntax of which is divided into component centric tags and scripting centric tags. The JSP file is translated and compiled, if necessary, to encapsulate all the referenced components into a Java servlet 16, which, in turn, sends (using HTTP) all the information to the browser in standard HAML format 17. Such translation and compilation is typically performed by a JSP code parser to translate the JSP code to Java source code and then compiled by a Java source to byte-code compiler such as Java which is provided as part of Sun Microsystems, Inc.'s Java Development Kit (JDK). A reference implementation by Sun Microsystems, Inc.'s of the JavaServerPages technology provides such functionality. Alternatively, the browser may access a servlet (not shown) which, in turn, calls the JSP file, which then compiles and executes as above. Optionally, the servlet may access data on a database (DB) 18 through Sun Microsystems, Inc.'s Java database connectivity (JDBC) technology 19, which technology provides communication and query functionality for databases in the Java language.

Figure 2:
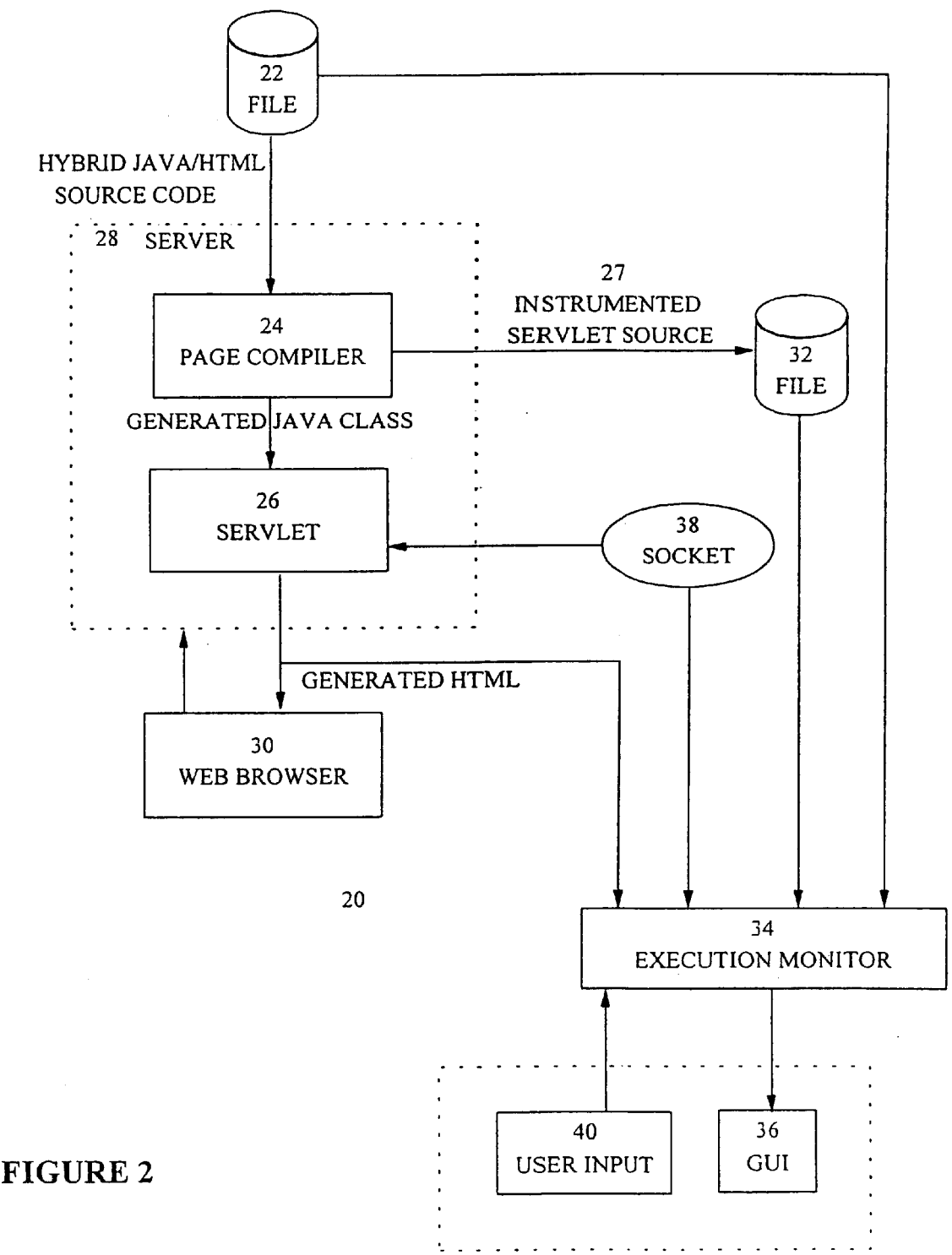
FIG. 2 is schematic diagram of a system for monitoring the execution of a JSP file according to an embodiment of the present invention.

Referring now to FIG. 2, a schematic diagram of a system for monitoring the execution of a hybrid source code file, such as a JSP file, in order to detect errors in the code is shown generally by numeral 20. The system generally comprises a hybrid source code file 22, which in a preferred embodiment is JSP source code, containing HTML and Java source code, which is stored on a file system; a Web application server 28 (comprising a virtual machine) for invoking a page compiler 24 to form the servlet 26 in response to an HTTP request from a Web browser 30 with respect to the JSP source code 22, for executing the servlet in response to an HTTP request and for providing HTML output from the servlet to the browser; a page compiler 24 which is called by the server 28 for reading the JSP source code, translating the JSP code into instented source code 27 by inserting instrumentation in the translated JSP source code or servlet source code for supporting execution tracing, and arranging for the compiling of the instrumented servlet source code into a servlet; a Web browser 30 for sending an HTTP request with respect to the JSP source code (and corresponding servlet) to the server and for displaying received HTML code from the servlet 26; a second file 32 that contains the instrumented source code 27 received from the page compiler 24; an execution monitor 34 for reading the instrumented servlet source code 27, the output from the servlet 26 and the JSP code 22, for receiving information from the executing servlet based on the instrumentation contained in the servlet, for displaying selected information about the execution of the JSP code file to the developer on a graphical user interface (GULI) 36 and for supplying a user input interface 40 for providing commands to the execution monitor 34. A socket 38 is also provided for bi-directional communication between the executing servlet 26 and the execution monitor 34. The execution monitor thus allows the developer to view the correlation between the JSP code, the servlet code and the HTML code that is generated by the servlet. Each of the above components will now be discussed in detail.

In a preferred embodiment, the server, page compiler, browser and execution monitor are integrated into a development environment such as International Business Machines Corporation's VisualAge® for Java software program thus allowing the server, page compiler, browser and execution monitor to be run on the same machine. A switch mechanism is provided for selectively enabling the page compiler in one of two modes, a normal mode in which the execution monitor is not enabled and a trace mode where the execution monitor is enabled. If the execution monitor is not enabled, the page compiler will simply compile each code segment of the JSP source code into a Java servlet until the file is complete. If the monitor is enabled then instrumentation is added to the servlet (and the servlet source code) for use by the execution monitor.

Figure 3A:
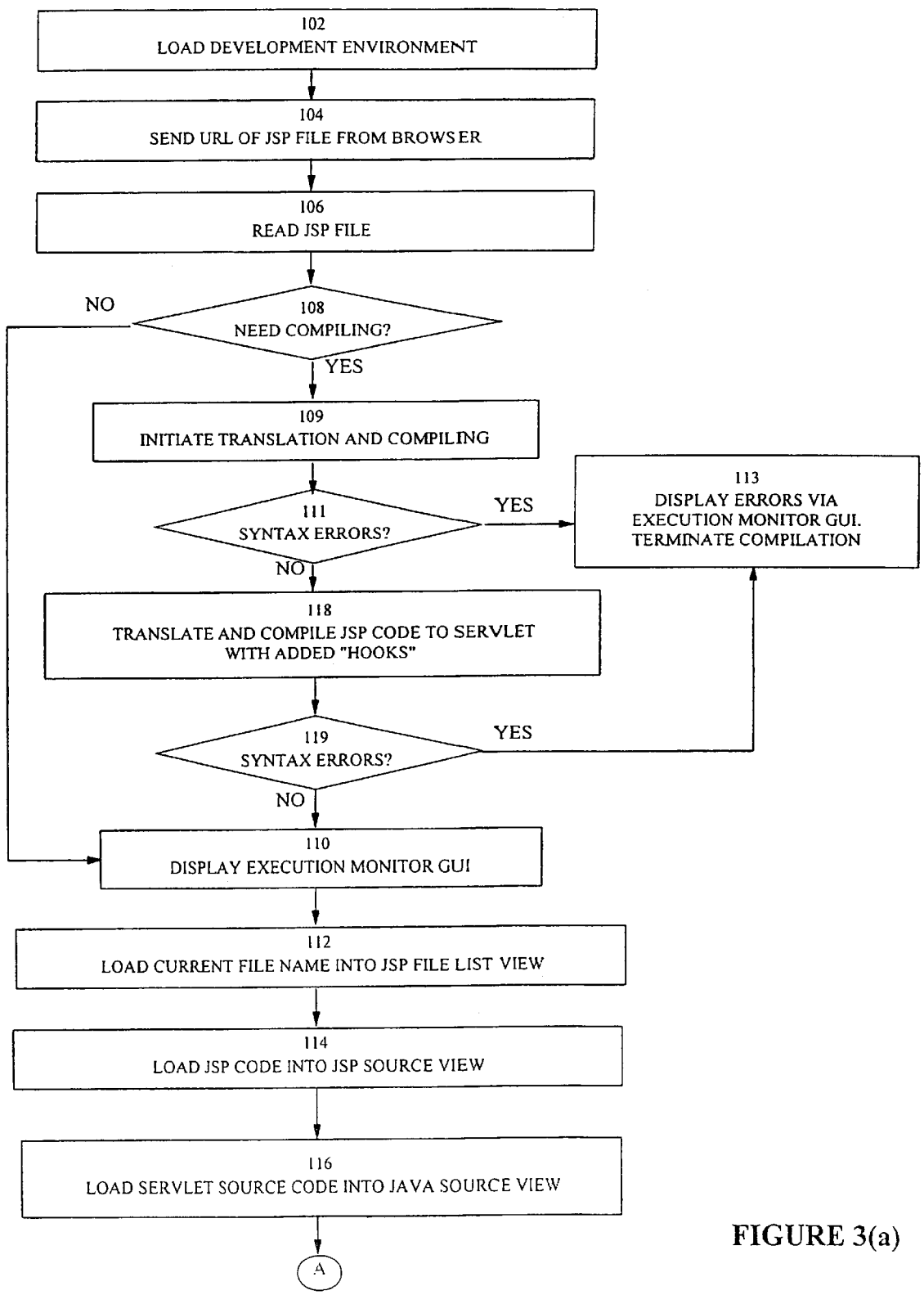
FIGS. 3(a) and 3(b) are flow charts showing the operation of the system of FIG. 2.

Referring now to FIGS. 3(a) and (b), a flow diagram illustrating the operation of the system is indicated generally by numeral 100. The user loads the development environment 102 at which point the virtual Web application server is loaded onto the system. Next, the user sets the trace or normal mode of operation of the execution monitor 34, and sends 104 the URL of the JSP file 22 from the browser 30 to the Web application server 28. The server 28 invokes the page compiler 24 which reads 106 the JSP source file 22. An example of a JSP source code file is shown in the following table. The Java code is delimited by <% and %>.

| Line # | Source Text |
| --- | --- |
| 1 | <%for(int i=0; i<=100; i+=10) {%> |
| 2 | <tr ALIGN=RIGHTBGCOLOR="#CCCCCC"> |
| 3 | <td><%=i%></td> |
| 4 | <td><%=(i-32)*5/9%></td> |
| 5 | </tr> |
| 6 | <%}%> |

The page compiler checks 108 whether the JSP file 22 needs to be compiled, e.g. if there has been a change in the code since last compiled. If no compilation is required the execution monitor GUI 36 is displayed 110 and the operation of the system continues with step 112 and ensuing steps. Otherwise, the page compiler 24 initiates 109 the translation and compilation of the JSP source code. With the execution monitor 34 enabled, the page compiler first performs a syntax check 111 on the JSP code. If errors are found, they are displayed 113 the execution monitor and compilation in the page compiler is terminated. Details of this will be discussed later. If there are no errors, the page compiler translates 118 the JSP code (Table 1) into instrumented servlet source code 27 by adding 118 "hooks" (described later) to the instrumented servlet source code and compiling the instrumented servlet source code to form servlet 26. While translating and compiling, the page compiler also checks for syntax errors as described below. A section of the instrumented servlet source code for the JSP code example above is shown in the following table.

TABLE II

| Line # | Servlet source |
| --- | --- |
| 97 | for(int i=0;i<100;i+=10){ //com.ibm.ivj.jsp.debugger. JspDebugCharArrayChunk |

TABLE II-continued

| Line # | Servlet source |
|---|---|
|  | d:/www/html/temperature.jsp 18,43- |
|  | d:/www/html/temperature.jsp 20,5 |
|  | data[0].writeChars(381,2,out); |
| 100 | data[0].writeChars(383,34,out); |
|  | data[0].writeChars(417,2,out); |
| 102 | data[0].writeChars(419,4,out); |
|  | //com.sun.server.http.pagecompile.jsp. |
|  | ScriptletChunk |
|  | d:/www/html/temperature.jsp 20,5- |
|  | d:/www/html/temperature.jsp 20,13 |
| 104 | out.print(ServletUtil.toString(i)) |
|  | //com.ibm.ivj.jsp.debugger. |
|  | JspDebugCharArrayChunk |
|  | d:/www/html/temperature.jsp 20,13- |
| 106 | d:/ww/html/temperature.jsp 21,5 |
|  | data[0].writeChars(431,5,out); |
|  | data[0].writeChars(436,2,out); |
| 108 | data[0].writeChars(438,4,out); |
|  | //com.sun.server.http.pagecompile.jsp. |
|  | ScriptletChunkd:/www/html/temperature.js |
|  | p21,5-d:/www/html/temperature.jsp 21,28 |
| 110 | out.print (ServletUtil.toString((i |
|  | 32( *5/9)); |
|  | //com.ibm.ivj.jsp.debugger. |
|  | JspDebugCharArrayChunkd:/www/html/temper |
|  | ature.jsp21,28- |
|  | d:/www/html/temperature.jsp23,1 |
| 112 | data[0].writeChars(465.5,out); |
|  | data[0].writeChars(470,2,out); |
|  | data[0].writeChars(472,5,out); |
| 114 | data[0].writeChars(477.2,out); |
|  | //com.sun.server.http.pagecompile.jsp.Sc |
| 117 | riptletChunkd:/www/html/temperature.jsp |
|  | 23,1-d:/www/html/temperature.jsp23,8 |
|  | } |

This instrumented servlet source code is saved in a file 32 for use by the execution monitor 34. The instrumented servlet source code is also checked for syntax errors 119. If errors are found, these are also displayed by the execution monitor 113 and the compilation in the page compiler is terminated.

It may be observed that each code segment of the JSP code (which includes a single line of Java code blocks, list of related Java code or HTML tags) may translate to more than one line of the instrumented servlet source code so it is necessary to have a method to correlate the JSP code segments with the instrumented servlet source code lines. Specific "hooks" must be added by the page compiler 24 to the instrumented servlet some code. The first of these "hooks" are "line" methods which enable the execution monitor to correlate a line of instrumented servlet source code (Table II) to the corresponding code segment of there JSP code (Table I). This is achieved by the page compiler creating a table or mapping at the time of compilation that is stored in the servlet and is referenced by the line method. Examples of the line methods—"line (46)" and "line (48)"—are shown in Table II. Thus when the Web application server executes the servlet, the line methods, when invoked, will send via the socket 38 the line numbers from the mapping table to the execution monitor 34. This process allows the execution monitor to synchronize the line of the executing instrumented servlet source code (in the servlet) with its corresponding JSP source code segment. The line method also provides for pausing of the servlet by means of communications between the servlet and the execution monitor via the socket.

The second of these "hooks" is the redirection of the HTML output from the servlet to the execution monitor as well as the browser. This is accomplished by providing a modified Print Writer class. The Print Writer class, provided in Sun Microsystems, Inc.'s Java Development Kit (JDK), is used to print out formatted text to an output stream. In this case, the formatted text (HTML output) is sent to both the browser and the execution monitor.

Figure 4:
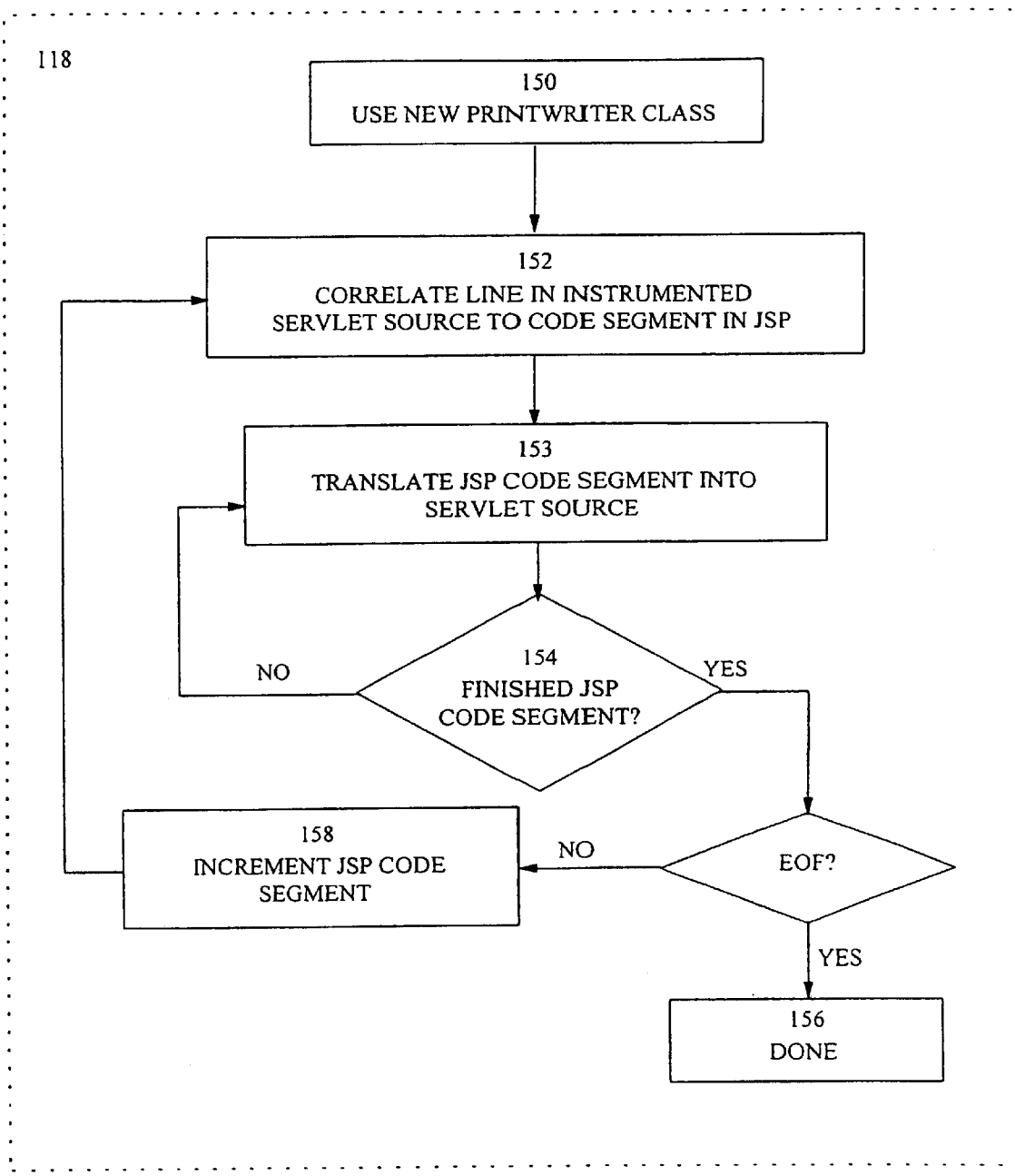
FIG. 4 is a flow chart showing a portion of a page compile process according to an embodiment of the present invention.

Referring now to FIG. 4, a detailed flow diagram of the portion of the page compile process at step 118 is shown. The page compiler first overwrites 150 the usual PrintWriter class with a new PrintWriter class for sending the output to the execution monitor (as well as the browser). The page compiler then continues to process the JSP code into instrumented servlet source code For each code segment of the JSP code, the page compiler creates an entry in a mapping table as described above, relating it to the corresponding line(s) in the instrumented servlet source code 152 and inserts a line method into the instrumented servlet source code line(s). In a preferred embodiment, the JSP code segment is correlated only to the first line of the corresponding instrumented servlet source code, although it is possible to add the line method to each of the lines created in the instrumented servlet source code.

The page compiler then proceeds to translate 153 the JSP code segment into corresponding servlet source code line(s). If the translation step has finished 154 with the JSP code segment (otherwise continuing to translate the JSP code segment) the page compiler inquires whether the end of the JSP code file (EOF) has been reached. If not, the compiler moves to the next JSP code segment 158 for translation and the page compiler repeats the steps from step 152. If the end of file has been reached, the instrumented servlet source code (along with the mapping table) is compiled into a servlet. The page compiler can invoke the standard Java source code to byte-code compiler (Java compiler) provided in the JDK although other compiler means are readily apparent to those skilled in the art. At the completion of the page compile process, the JSP code has been translated into instrumented servlet source code (which in the preferred embodiment is stored to a file system such as a hard disk) and executable code (class file) in the form of a servlet (which in the preferred embodiment is also stored to a file system such as a hard disk).

Figure 3B:
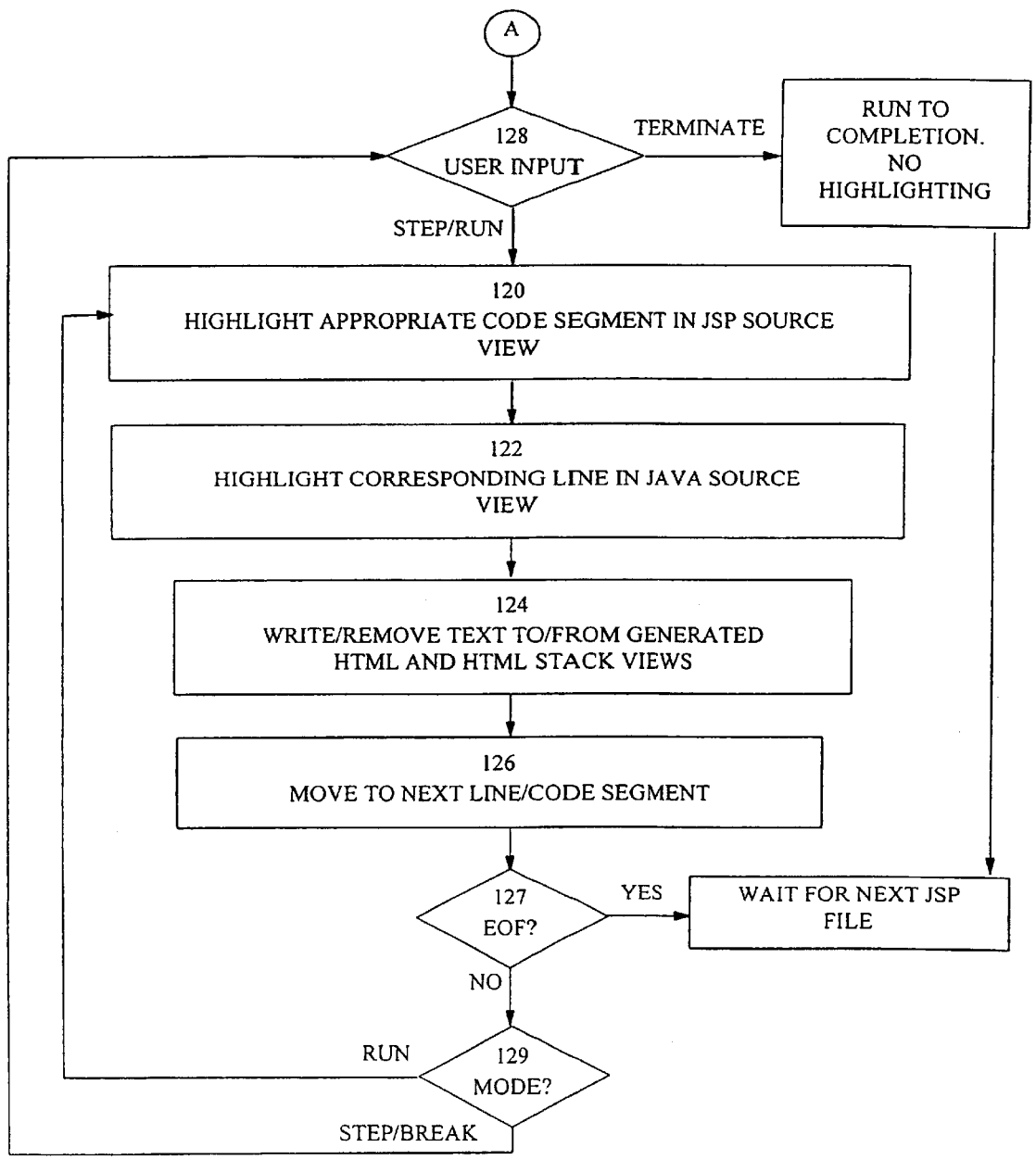

Turning back to FIGS. 3(*a*) and 3(*b*) as described above, in addition to adding "hooks" into the compiled code the page compiler 24 checks for syntax errors or semiantic errors 119 during translation and compilation. There are two kinds of syntax errors, namely JSP syntax errors and generated Java syntax errors. Some of the JSP syntax errors will be caught by the precompiler of the page compiler, e.g. Missing end INSERT tag. Other JSP syntax errors and Java syntax errors inside the JSP file that are not caught by the precompiler (a generated Java syntax error) will be caught by the Java compiler. Syntax error handling is added in the execution monitor to effectively point out to the users the syntax errors, especially generated Java syntax errors. The mapping table may be utilized by the page compiler, such that when the page compiler sees a syntax error in the JSP file, an exception will be thrown that allows the execution monitor to display the syntax error message, thereby allowing a user to visually match the JSP code segment that has the syntax error with the syntax error message itself. Optionally, the syntax errors may be displayed in the browser.

In order to display the errors in the execution monitor, the exception during compilation is intercepted. The syntax error message is parsed and the information is sent to and displayed by the execution monitor. A standard syntax error message from the precompiler is shown below:

<column>,<row>:<JSP syntax error message> e.g. 5,1:Unterminated <insert> tag.

For the JSP syntax errors, the starting and ending JSP code segment information is retrieved from the mapping table in order to highlight the exact code segment that has the JSP syntax error. For Java syntax errors, the starting and ending JSP code segment information and the corresponding startling line and position are retrieved from the mapping table in order to highlight the exact JSP code segment and the corresponding servlet source line(s) that has the Java syntax error.

Figure 5:
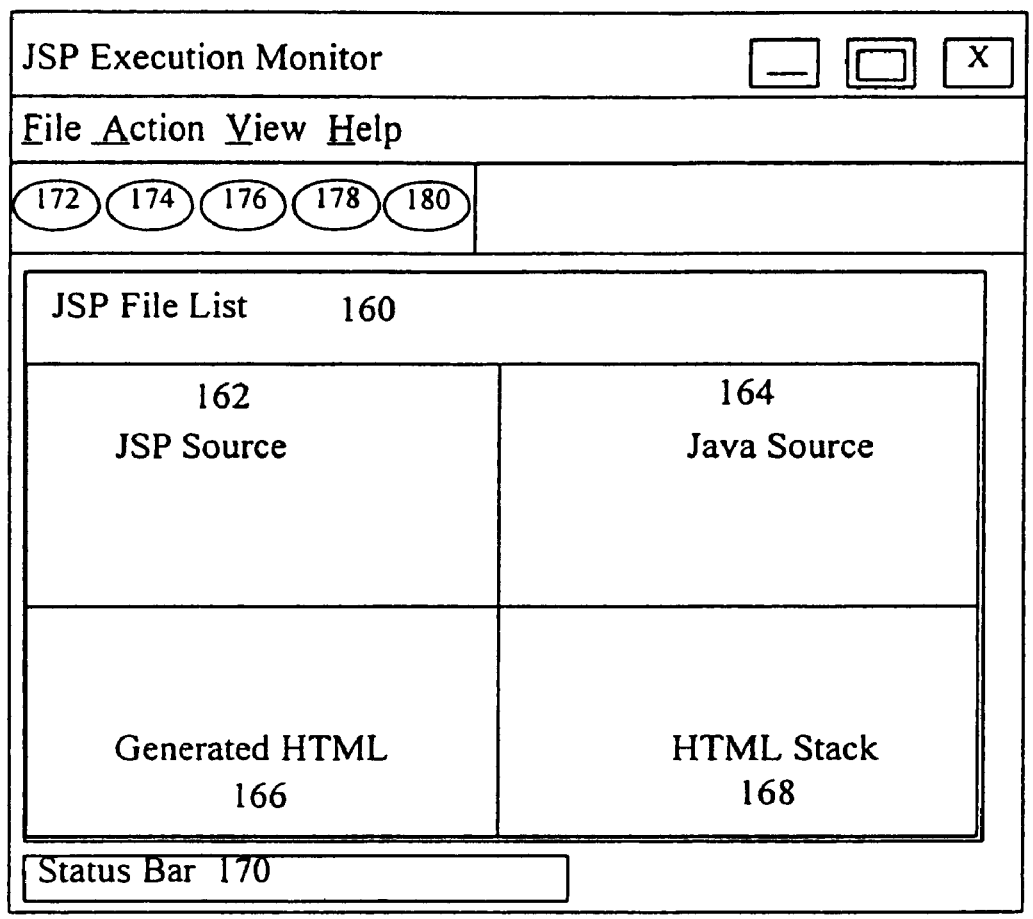
FIG. 5 is a plan view of a GUI display according to an embodiment of the present invention.

If there are no syntax errors in both the JSP code and the executable Java code servlet, the servlet is compiled and the execution of the servlet within the Web server is ready to be monitored 110 in the execution monitor. The servlet communicates to the execution monitor. The servlet communicates to the execution monitor via the socket 38. The servlet informs the monitor of the name of the JSP file 112, at which point the execution monitor can retrieve 114 the JSP code as well as retrieve 116 the instrumented servlet source code 32 (e.g. from the hard disk). In a preferred embodiment, the instrumentation is removed from the instrumented servlet source code before presentation on the execution monitor GUI. Initially, the execution monitor will wait for input from the user 128, before the servlet begins to run, on how the user would like to proceed. Optionally, the user can terminate the servlet execution (which will trigger the servlet to run to completion) and the system will wait for another JSP file (which the user can supply by following step 104 and ensuing steps) or any other user action. Otherwise, the user can, for example, step the execution of the servlet—step mode—or ask the servlet to run freely (after, for example, a pause caused by the user or a breakpoint set in the code)—run mode. When stepping or running, the currently executing line of servlet source code 120 and the corresponding code segment of the JSP code 122 is highlighted in the execution monitor GUI. As described above, the line method facilitates this coordination between the JSP code and servlet source code. Further, the servlet may produce HTML output which is sent to the browser and also to the execution monitor for display in the execution monitor GUI 124. The system then moves to the next line/code segment of the code 126. If there is no next line/code segment because the servlet has run its course, i.e. the end of file (EOF) has been reached 127, then the system will wait for another JSP file (or any other user action). The line method also causes the servlet 26 to pause its operation. It will signal the execution monitor 34 via the socket 38 and wait for a response before continuing. If the execution monitor is in run mode 129, it will signal the servlet 26 via the socket 38 to continue running and step 120 and ensuing steps are performed. Otherwise, if the execution monitor is in step mode or a break has occurred (from, for example, a breakpoint inserted in the code) the execution monitor will wait for input from the user 128 and perform the ensuing steps depending on the user's input. Therefore, the execution monitor controls the progress of the servlet. Of course, and not shown, the user may optionally perform a number of other tasks in the system including terminating execution of the servlet and/or the system, editing the JSP code, setting breakpoints and may other standard maintenance, operational and development tasks in the system. Referring to FIG. 5, a schematic plan view of the execution monitor GUI display 36 is shown. The GUI not only displays the code execution but also provides for user input to control execution of the code. In a preferred embodiment, the user input 40 is integrated with the GUI 36.

The GUI provides the following views:

A JSP file list view 160 which shows the currently executing JSP file. For example, it is possible for one JSP file to call another JSP file directly or indirectly. All these JSP files may be displayed in the file list view, but with the currently executing JSP file highlighted.

A JSP source view 162 shows the source code for the currently selected JSP file 22. The JSP source view highlights the currently executing code segment of the JSP file. The user can optionally set breakpoints at code segments of the JSP file which cause the execution to pause.

A Java source view 164 shows the servlet source code that is generated from the currently selected JSP file. In a preferred embodiment, the instrumentation is removed from the instrumented servlet source code to show simply the servlet source code. The currently executing line of the servlet source code may be highlighted. The JSP source view and the Java source view are coordinated so the code segment of the JSP source and the line(s) of the servlet source code that relate to that code segment may both be highlighted. As execution proceeds the user sees an animation of the currently executing lines. The coordination between Java source and JSP source views is achieved by the line methods in the instrumented servlet source code as shown in Table II.

A generated HTML view 166 shows the HTML that is generated by the servlet corresponding to the JSP file. The contents of this view grows as the servlet executes. The generated HTML view is captured by the execution monitor by replacing the usual PrintWriter class of the HTTP response object by a modified PrintWriter class as described above.

An HTML stack view 168 shows an a view of the generated HTML that only includes the currently unended HTML tags. For example, HTML tags that are not ended may not render properly in an HTML browser. The HTML stack aids the user in finding errors that result in improperly ended tags. The GUI allows the user to select a tag in the HTML stack view and the GUI then highlights the corresponding line in the generated HTML view.

A status bar 170 is also provided which displays a current syntax error that is generated in either the JSP source code or the instrumented servlet source code as described with reference to FIG. 3(a). The corresponding line in either the JSP source view or the Java source view will be highlighted.

The input area of the GUI further provides a set of button inputs for stepping the execution 172, running the execution 174, stopping the execution 176, viewing a previous syntax error 178, and viewing a next syntax error 180. When buttons 178 and 180 are used, the status bar is updated with the appropriate syntax error. As well, code segment/line highlights in views 162 and 164 are updated to correspond to the syntax error in the status bar.

It can be seen that the execution monitor now has access to and can display to a user at least the name of the currently executing servlet, the JSP code, the instrumented servlet source code, and the HTML code output from the servlet.

Thus, it may be seen that the present invention allows a user to monitor the execution of a JSP file and to detect and resolve errors in the syntax of the JSP code as well as runtime errors in the execution of the JSP file. Furthermore, the present invention provides the above functionality in a unified development environment.

The invention may be implemented as a program storage device readable by a data processing system, tangibly embodying a program of instructions, executable by said data processing system to perform the method steps of the invention. Such a program storage device ma include diskettes, optical discs, tapes, CD-ROMS, hard drives, memory including ROM or RAM, computer tapes or other storage media capable of storing a computer program.

The invention may also be implemented in a computer system. In a preferred embodiment, a system is provided comprising a computer program operating on a data processing system, with the computer program embodying the method of the invention and producing an output of the method on a display or output device. Data processing systems include computers, computer networks, embedded systems and other systems capable of executing a computer program. A computer includes a processor and a memory device and optionally, a storage device, a video display and/or an input device. Computers may equally be in stand-alone form (such as the traditional desktop personal computer) or integrated into another apparatus (such as a cellular telephone).

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for monitoring the execution of hybrid source code which is executable on a server, comprising the steps of:
   generating executable code for execution by the server from the hybrid source code included in a single hybrid source code file comprising a source code in a second language imbedded in a source code of a markup language;
   providing instrumentation in the executable code for supporting execution tracing; and
   receiving in an execution monitor information from the instrumentation in the executable code for display on a user interface.

2. The method of claim 1 wherein the step of generating executable code comprises translating the hybrid source code into source code.

3. The method of claim 2 wherein the step of providing instrumentation comprises inserting instrumentation into the source code.

4. The method of claim 3 wherein the instrumentation comprises a mapping table comprising information correlating a code segment in the hybrid source code with a line in the source code.

5. The method of claim 4 wherein the instrumentation further comprises a line method for communicating said correlating information to the execution monitor.

6. The method of claim 2 further comprising displaying on the user interface the hybrid source code and the source code.

7. The method of claim 2 further comprising correlating a code segment from the hybrid source code with one or more lines of code from the source code using the instrumentation.

8. The method of claim 1 wherein the hybrid source code is JavaServer Pages code.

9. A method for monitoring execution of hybrid source code which executes in a server, comprising the steps of:
   translating the hybrid source code by a page compiler into a source code form and an executable code;
   providing methods into the executable code, such that when the server executes the executable code, the methods are invoked and send line information to an execution monitor allowing the execution monitor to synchronize an executing code segment of the hybrid source code with a corresponding line of the source code; and
   displaying the executing code segment of the hybrid source and the corresponding line of the source code in a user interface.

10. A program storage device readable by a data processing system, tangibly embodying a program of instructions, executable by the data processing system to perform a method for monitoring the execution of hybrid source code which is executable on a seer, the method comprising the steps of:
    generating executable code for execution by the server from the hybrid source code included in a single hybrid source code file comprising a source code in a second language imbedded in a source code of a markup language;
    providing instrumentation in the executable code for supporting execution tracing; and
    receiving in an execution monitor information from the instrumentation in the executable code for display on a user interface.

11. A computer program product for monitoring the execution of hybrid source code which is executable on a server, said computer program product comprising:
    a page compiler for reading and translating the hybrid source code included in a single hybrid source code file comprising a source code in a second language imbedded in a source code of a markup language into executable code for execution by the server and for inserting instrumentation in the executable code for supporting execution tracing; and
    an execution monitor for receiving information from the instrumentation in the executable code for display on a user interface.

12. A computer program product for displaying the execution of hybrid source code which is executable on a server, comprising:
    a page compiler for translating the hybrid source code included in a single hybrid source code file comprising a source code in a second language imbedded in a source code of a markup language, inserting instrumentation for execution tracing in source code translated from the hybrid source code and compiling the hybrid source code into executable code for execution by the server; and
    an execution monitor for receiving as input and for displaying in a user interface of the execution monitor, the hybrid source code, the source code, and information from the instrumentation in the executable code.

13. The computer program product of claim 12 further comprising a server for executing the executable code provided by the page compiler, and providing the information from the instrumentation in the executable code to the execution monitor.

14. The computer program product of claim 13 further comprising a browser for sending a request with respect to the hybrid source code, wherein the server further invokes the page compiler in response to the request and provides an output from the executable code to the browser.

15. The computer program product of claim 13 wherein the execution monitor further receives output from the executable code and wherein the server provides the output from the executable code to the execution monitor.

16. The computer program product of claim 13 further comprising bi-directional communication means for communicating between the executable code and the execution monitor including communicating the information from the instrumentation in the executable code to the execution monitor.

17. The computer program product of claim 13 wherein the hybrid source code is JavaServer Pages code.

18. A computer system for monitoring the execution of hybrid source code which is executable on a server, said computer system comprising:
   a page compiler for reading and translating the hybrid code included in a single hybrid source code file comprising a source code in a second language imbedded in a source code of a markup language into executable code for execution by the server and for inserting instrumentation in the executable code for supporting execution tracing;
   an execution monitor for receiving information from the instrumentation in the executable code for display on a user interface.

19. A computer system for displaying the execution of hybrid source code which is executable on a server, comprising:
   a page compiler for translating the hybrid source code included in a single hybrid source code file comprising a source code in a second language imbedded in a source code of a markup language into source code, inserting instrumentation for execution tracing in the source code and compiling the hybrid source code into executable code for execution by the server; and
   an execution monitor for receiving as input and for displaying in a user interface of the execution monitor, the hybrid source code, the source code, and information from the instrumentation in the executable code.

20. The computer system of claim 19 further comprising a server for executing the executable code provided by the page compiler, and providing the information from the instrumentation in the executable code to the execution monitor.

21. The computer system of claim 20 further comprising a browser for sending a request with respect to the hybrid source code, wherein the server further invokes the page compiler in response to the request and provides an output from the executable code to the browser.

22. The computer system of claim 20 wherein the execution monitor further receives output from the executable code and wherein the server provides the output from the executable code to the execution monitor.

23. The computer system of claim 20 further comprising a bi-directional communication means for communicating information between the executable code and the execution monitor including information from the instrumentation to correlate a code segment of the hybrid source code and a line in the source code.

24. An article of manufacture comprising;
   a computer usable medium having a computer readable program code embodied therein for monitoring the execution of hybrid source code, comprising HTML and Java code, running on a Web application server, the computer readable program code in said article of manufacture comprising:
      computer readable program code configured to cause a computer to read and translate the hybrid source code into an executable program and for inserting instrumentation in the executable program;
      computer readable program code configured to cause a computer to read the hybrid source code, a source code translated from the hybrid source code and an output from the executable program and for displaying the hybrid source code, source code and the output in respective views on a graphical user interface; and
      computer readable program code configured to cause a computer to communicate information between the instrumentation of the executable program and the graphical user interface whereby the information is used by the graphical user interface to correlate in the views a code segment of the hybrid source code with a line in the source code translated from the hybrid source code.

* * * * *

UNITED STATES PATENT AND TRADEMARK OFFICE
CERTIFICATE OF CORRECTION

PATENT NO.    : 6,654,949 B1                                    Page 1 of 1
DATED         : November 25, 2003
INVENTOR(S)   : Michael L. Fraenkel et al.

It is certified that error appears in the above-identified patent and that said Letters Patent is hereby corrected as shown below:

Column 1,
Line 60, after "applet" insert -- . --

Column 5,
Line 18, "HAML" should read -- HTML --
Line 46, "instented" should read -- instrumented --
Line 61, "(GULI)" should read -- (GUI) --

Column 7,
Line 27, "465.5,out" should read -- 465,5,out --
Line 29, "472,5.out" should read -- 475,5,out --
Line 30, "477.2,out" should read -- 477,2,out --

Column 9,
Line 63, "Referring to FIG. 5…" should begin a new paragraph.

Column 10,
Line 32, after "shows" delete "an"

Column 12,
Line 13, "seer" should read -- server --

Signed and Sealed this

Twentieth Day of April, 2004

JON W. DUDAS
*Acting Director of the United States Patent and Trademark Office*